(12) United States Patent
Roukes

(10) Patent No.: US 9,442,021 B2
(45) Date of Patent: Sep. 13, 2016

(54) UNCOOLED IR DETECTOR ARRAYS BASED ON NANOELECTROMECHANICAL SYSTEMS

(71) Applicant: CALIFORNIA INSTITUTE OF TECHNOLOGY, Pasadena, CA (US)

(72) Inventor: Michael L. Roukes, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 34 days.

(21) Appl. No.: 13/919,642

(22) Filed: Jun. 17, 2013

(65) Prior Publication Data
US 2015/0253196 A1   Sep. 10, 2015

Related U.S. Application Data

(63) Continuation-in-part of application No. 12/536,036, filed on Aug. 5, 2009, now Pat. No. 8,487,385.

(60) Provisional application No. 61/137,939, filed on Aug. 5, 2008.

(51) Int. Cl.
    *G01J 5/44* (2006.01)
    *G01K 11/26* (2006.01)
(52) U.S. Cl.
    CPC . *G01J 5/44* (2013.01); *G01K 11/26* (2013.01)
(58) Field of Classification Search
    CPC .................................. G01J 5/44; G01K 11/26
    USPC ........................... 257/414, E29.166; 977/902
    See application file for complete search history.

(56) References Cited

U.S. PATENT DOCUMENTS

| 5,686,779 A | 11/1997 | Vig |
| 5,744,902 A | 4/1998 | Vig |
| 2002/0166962 A1* | 11/2002 | Roukes et al. ................ 250/306 |
| 2005/0273824 A1* | 12/2005 | Matic ............................... 725/80 |
| 2006/0155478 A1* | 7/2006 | Roukes ............ G01N 33/54373 702/19 |
| 2008/0136563 A1* | 6/2008 | Duwel et al. ................. 333/186 |

OTHER PUBLICATIONS

Zhang et. al., "Nanomechanical Torsional Resonators for Frequency-Shift Infrared Thermal Sensing", Nano Letters, ASC Publications, received Dec. 19, 2012; revised Feb. 14, 2013; possibly published Mar. 4, 2013, dx.doi.org/10.1021/nl304687p.

* cited by examiner

*Primary Examiner* — Ori Nadav
*Assistant Examiner* — Vernon P Webb
(74) *Attorney, Agent, or Firm* — The Marbury Law Group, PLLC

(57) ABSTRACT

We describe the use of a high-quality-factor torsional resonator of microscale dimensions. The resonator has a paddle that is supported by two nanoscale torsion rods made of a very low thermal conductivity material, such as amorphous ("a-") silicon. The body of the torsion paddle is coated with an infrared-absorbing material that is thin and light weight, but provides sufficient IR absorption for the applications. It may be placed above a reflecting material of similar dimensions to form a quarter wave cavity. Sensing of the response of the paddle to applied electromagnetic radiation provides a measure of the intensity of the radiation as detected by absorption, and the resulting temperature change, in the paddle.

20 Claims, 12 Drawing Sheets

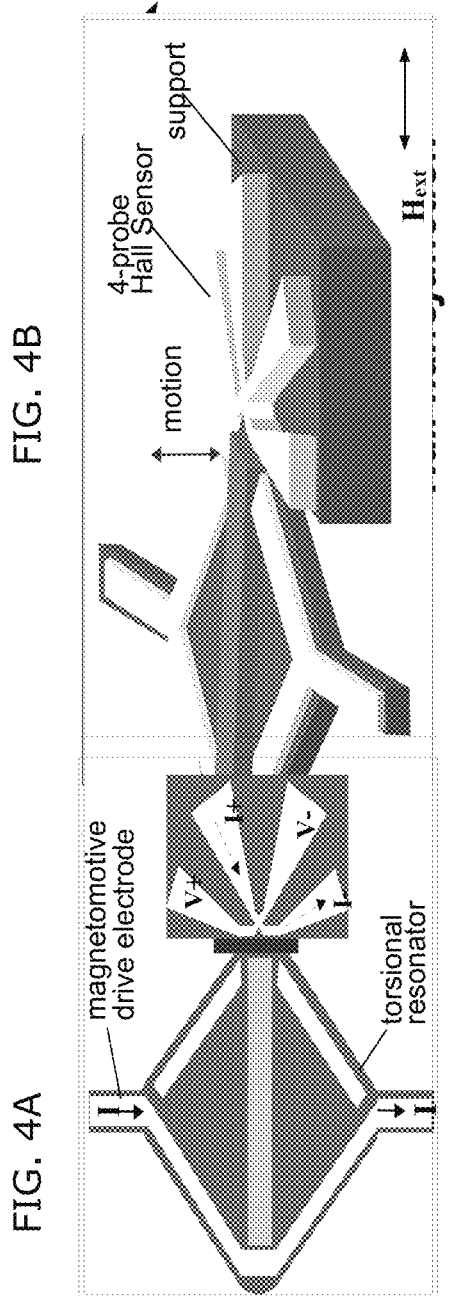
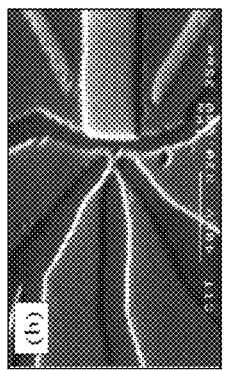
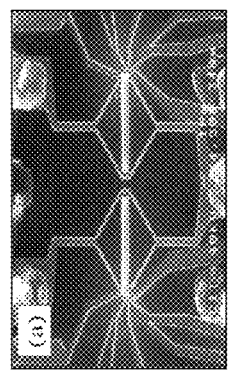
FIG. 4A
FIG. 4B
FIG. 4C
FIG. 4D

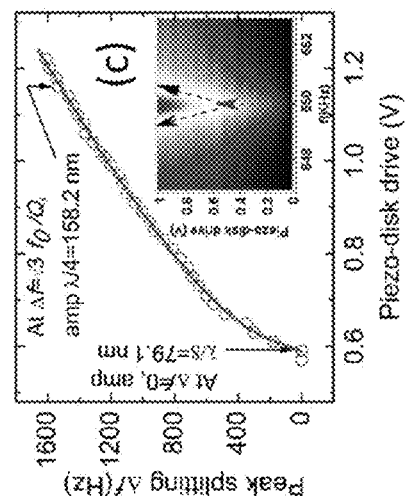
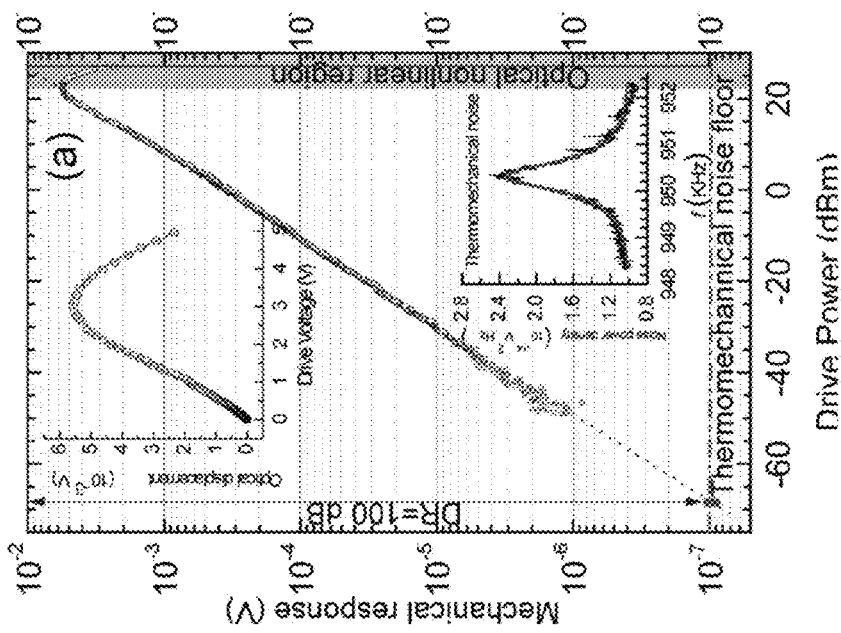
FIG. 7A
FIG. 7B
FIG. 7C

FIG. 9A
FIG. 9D
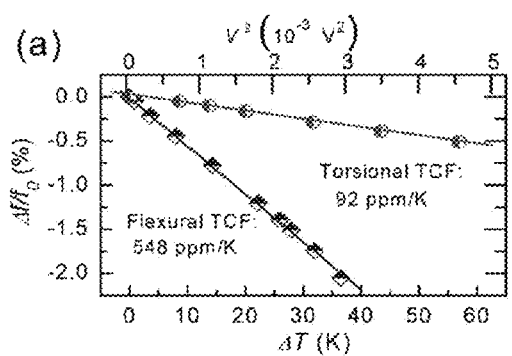
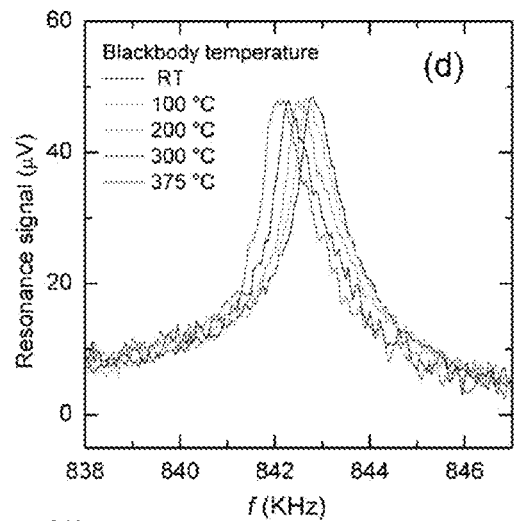
FIG. 9B
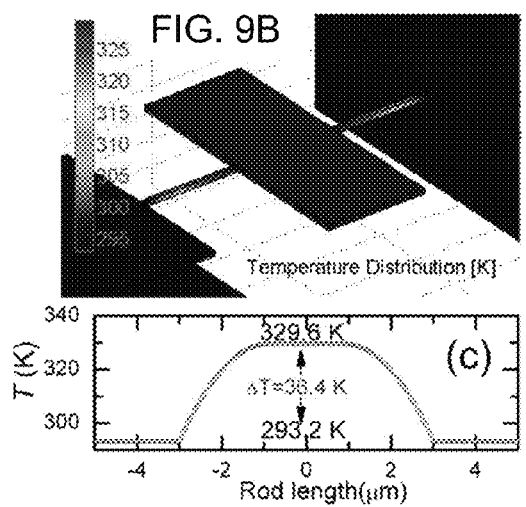
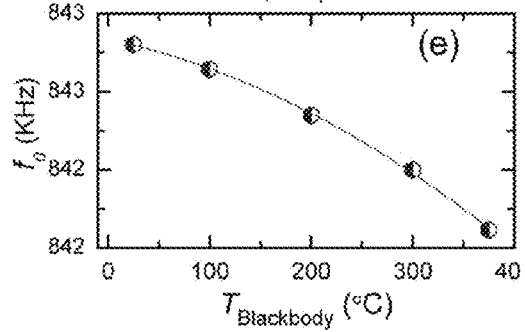
FIG. 9C
FIG. 9E

UNCOOLED IR DETECTOR ARRAYS BASED ON NANOELECTROMECHANICAL SYSTEMS

CROSS-REFERENCE TO RELATED APPLICATIONS

This application claims priority to and the benefit of U.S. patent application Ser. No. 12/536,036, filed Aug. 5, 2009, now U.S. Pat. No. 8,487,385 which itself claimed priority to and the benefit of then U.S. provisional patent application Ser. No. 61/137,939, filed Aug. 5, 2008, each of which applications is incorporated herein by reference in its entirety.

FIELD OF THE INVENTION

The invention relates to thermal detectors in general and particularly to infrared detectors that operate at ambient temperatures.

BACKGROUND OF THE INVENTION

Temperature sensing using cooled detectors, such as those made of such as those based on mercury-cadmium-telluride materials or those based on superconducting materials, has been known for some time.

Temperature sensing systems based on quartz resonators that operate at ambient temperatures have been described by Vig in various patents, including U.S. Pat. Nos. 5,686,779 and 5,744,902. Vig teaches the use of quartz crystals cut at specific orientations. In particular, Vig explains that, since quartz is anisotropic, crystal cut orientations can be found to minimize, or alternatively, to selectively increase sensitivity to temperature.

There is a need for an ambient temperature sensing system that is more sensitive than existing systems.

SUMMARY OF THE INVENTION

According to one aspect, the invention relates to a nanoelectromechanical sensing element. The nanoelectromechanical sensing element comprises a substrate having a surface, the substrate comprising an isotropic material, the surface having defined therein a cavity for accommodating a nanoelectromechanical structure; a nanoelectromechanical torsional resonator having a width w and a length l, and having a torsional support connecting a first side and a second side of the nanoelectromechanical torsional resonator to the substrate, the torsional resonator having a Q greater than 1000 in vacuo, the nanoelectromechanical torsional resonator and the torsional support configured to provide an oscillation of the nanoelectromechanical torsional resonator at a predetermined frequency; and a displacement sensor configured to sense a displacement of the nanoelectromechanical torsional resonator relative to the substrate and configured to provide an output signal. When a stimulus is received by the nanoelectromechanical torsional resonator, the displacement sensor provides an output signal indicative of a parameter of the stimulus.

In one embodiment, the nanoelectromechanical sensing element has a temperature resolution below 100 mK.

In another embodiment, the nanoelectromechanical sensing element has a temperature resolution below 50 mK.

In yet another embodiment, the nanoelectromechanical sensing element has a temperature resolution below 10 mK.

In one embodiment, the isotropic material is amorphous silicon. In one embodiment, the width w is 10 microns and the length l is 20 microns.

In one embodiment, the isotropic material is amorphous silicon. In one embodiment, the width w is 2 microns and the length l is 5 microns.

In one embodiment, the stimulus is a thermal signal.

In one embodiment, the thermal signal is an infrared signal.

In one embodiment, the nanoelectromechanical sensing element further comprises a material configured to absorb thermal radiation disposed on the nanoelectromechanical torsional resonator.

In one embodiment, the material configured to absorb thermal radiation is TiN.

In one embodiment, the cavity defined in the surface of the substrate is configured to provide a quarter wave cavity.

In one embodiment, the cavity comprises a reflector.

In one embodiment, the thermal signal is a signal selected from the group consisting of gamma rays, x-rays, ultraviolet light, visible light, microwave energy and millimeter wave energy.

In one embodiment, the displacement sensor is a laser interferometric displacement detector.

In one embodiment, the displacement sensor is a Hall displacement sensor.

In one embodiment, the substrate has defined therein a plurality of cavities for accommodating a nanoelectromechanical structure.

In one embodiment, the nanoelectromechanical sensing element further comprises a first plurality of nanoelectromechanical torsional resonators, each nanoelectromechanical torsional resonator having a width w and a length l, and each having a torsional support connecting a first side and a second side of the nanoelectromechanical torsional resonator to the substrate, each of the nanoelectromechanical torsional resonators having a Q greater than 1000 in vacuo, and a second plurality of displacement sensors, at least one of the plurality of displacement sensors configured to sense a displacement of a respective one of the plurality of nanoelectromechanical torsional resonators relative to the substrate and configured to provide an output signal indicative of a stimulus applied to the nanoelectromechanical torsional resonator. In one embodiment, the first plurality is equal to the product N×M, where N and M are integers. In one embodiment, the N×M nanoelectromechanical torsional resonators are configured each to receive an infrared stimulus.

In one embodiment, the sensing element is configured to provide as output an image.

In one embodiment, the image is configured in an HDTV format.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4A and FIG. 4B are diagrams showing the Hall sensing geometry in greater detail.

FIG. 4C and FIG. 4D are images of the structures illustrated in FIG. 4A and FIG. 4B, at two different magnifications.

FIG. 7A is a graph that shows various features of the dynamic range of the torsional mode. The large graph shows the center resonance amplitude (in log scale) versus the piezodisk drive power. The initial linear response is followed by a downturning behavior at higher drive levels, as shown inside the shaded region at the right hand side. The top left inset shows the same data but in the linear scale with a sinusoidal fit denoted by the red curve. The thermomechanical noise spectrum is shown in the bottom right inset with a Lorentzian fit.

FIG. 7B is a graph that illustrates the interrelationships among optical displacement, drive voltage and frequency for another device. Initially the resonance amplitude linearly grows with the drive. Afterward it splits into two peaks with constant peak heights, shown by the two black arrowed lines.

FIG. 7C is a graph of the frequency splitting versus the drive voltage which can be modeled by a square root law.

FIG. 9A is a graph showing the relative frequency shift of the torsional (circles) and flexural (diamonds) mode versus the square of Joule heating voltage (top x-axis) and simulated temperature rise ΔT (bottom x-axis) for a device constructed according to principles of the invention.

FIG. 9B is a diagram showing a simulated temperature distribution profile at a bias at 0.056 V for such a device.

FIG. 9C is a graph that illustrates the temperature profile along the center line of the device.

FIG. 9D is a graph that shows the torsional resonances at various blackbody temperatures.

FIG. 9E is a graph that shows data for the resonant frequency as a function of blackbody temperature; the curve is a parabolic fitting to the data.

DETAILED DESCRIPTION

Nanoelectromechanical systems (NEMS) provide an opportunity to construct systems and devices that provide useful functions which cannot conveniently be attained in more conventional macroscopic systems. We describe nanomechanical torsional resonators for frequency-shift-based infrared (IR) thermal sensing. Nanoscale torsion rods, ~1 µm long and 50-100 nm in diameter, provide both extraordinary thermal isolation and excellent angular displacement and torque sensitivities, of order $\sim 10^{-7}$ rad·Hz$^{-1/2}$ and $\sim 10^{-22}$ (N·m)Hz$^{-1/2}$, respectively. Furthermore, these nanorods act as linear torsional springs, yielding a maximum angular displacement of 3.6° and a dynamic range of over 100 dB. These results exceed the performance of flexural modes by as much as 5 orders of magnitude. These attributes lead to superior noise performance for torsional-mode sensing. We demonstrate the operational principles of torsional-mode IR detection, attaining an uncooled noise equivalent temperature difference (NETD) of 390 mK. By modeling the fundamental noise processes, we project that further reduction of device size can significantly improve thermal responsivity; a room-temperature NETD below 10 mK is believed to be feasible.

We describe a new method for achieving sensitive infrared (IR) detection based on temperature-induced frequency shifts to a mechanical resonator. The local temperature rise of the resonator is induced by the absorption of radiation. This concept can form the basis for individual bolometers, or subsequently assembled—for example—to populate an infrared focal plane array for imaging applications.

Figure 1B:
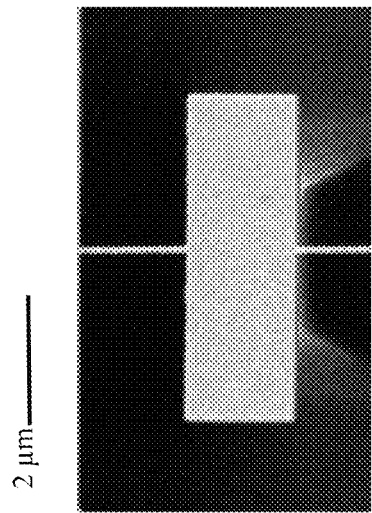
FIG. 1B is a scanning electron microscope image of a torsional device, with a 2 µm reference for comparison.
Figure 1D:
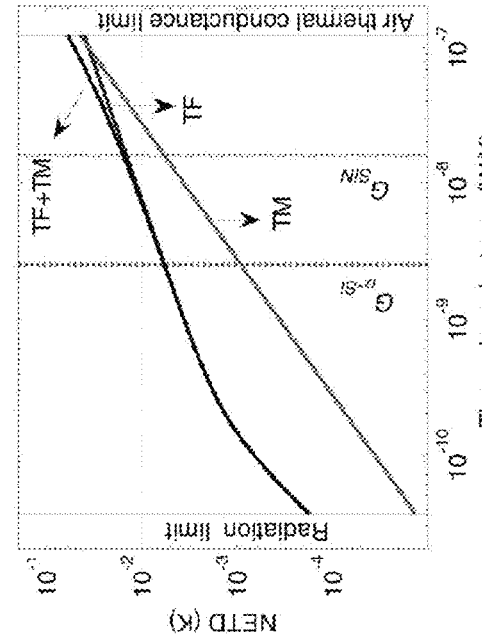
FIG. 1D is a graph that shows the calculated noise equivalent temperature difference (NETD) versus the thermal conductance. The "TM", "TF", and "TM+TF" labeled curves represent the thermomechanical noise, the temperature fluctuation noise limited, and total NETD. The left vertical line is the lowest thermal conductance set by the thermal radiation limit. The right vertical line is the upper limit of the thermal conductance set by the air gap underneath the device paddle. The vertical dashed lines denote the thermal conductance if the rod material is α-Si and SiN with a thermal conductivity of 0.5 and 3.2 W/(m·K), respectively.
Figure 1A:
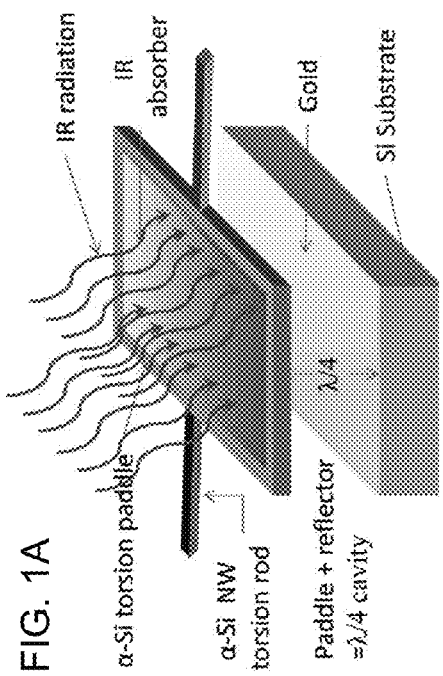
FIG. 1A is a schematic diagram of a torsional-frequency-shift-based IR detector.

Turning to FIG. 1A, we describe the use of a high-quality-factor torsional resonator of microscale dimensions.

The embodiment of FIG. 1A comprises a paddle that is supported by two nanoscale torsion rods made of a very low thermal conductivity material, such as amorphous ("a-")

silicon. Amorphous silicon is of interest because it has quite low thermal conductivity. As distinct from crystalline quartz, amorphous silicon does not have specific crystalline orientations, and would not be expected to exhibit anisotropies similar to those exhibited by crystalline quartz. In a preferred embodiment, the body of the torsion paddle is coated with an infrared-absorbing material that is thin and light weight, but provides sufficient IR absorption for the applications. It may be placed above a reflecting surface of similar dimensions to form a quarter wave cavity.

In the embodiment shown in FIG. 1A, a nanowire torsional rod comprising amorphous silicon (also referred to as "a-silicon" or "α-silicon") is used to support a paddle comprising a-silicon, for which a κ=0.1 W/(m·K) has been reported. The nanowire torsional rod is expected to provide a support having minimal thermal conductance, thereby increasing the thermal sensitivity of the bolometer. The paddle is expected to have dimensions of approximately 10 μm width by approximately 20 μm length, with the a-silicon torsional rod supporting the paddle at the midpoint of its length dimension. The a-silicon torsional rod is expected to have a cross sectional dimension of approximately 50 nm by 50 nm. The length of the torsional rod is expected to extend approximately 1 μm out from each side of the paddle and to support the paddle by connecting to a substrate having an aperture designed to accommodate the paddle. In some embodiments, the substrate that supports the paddle has defined therein a cavity or a void, for example a cavity long enough and wide enough to allow the paddle to move rotationally on the a-silicon torsional rod without interference. In some embodiments, the cavity has a depth calculated to be of the order of ¼ of the wavelength of the infrared electromagnetic radiation that the paddle is designed to respond to, and to have disposed on the surface of the substrate at the "bottom" of the cavity a reflector, so as to provide a ¼ wavelength (¼ λ) reflector. For 10 μm radiation, for example, this would involve a 2.5 μm spacing between a reflector affixed to the substrate and the paddle. A suitable reflector can be a layer of a metal such as gold, a series of layers of optical materials calculated to reflect in the wavelength range of interest, or a compound having suitable reflective properties. The paddle can be coated on one side, for example the side that will receive electromagnetic radiation (such as infrared radiation) from an external source, with a material such as titanium nitride (TiN) that increases the absorption of the received electromagnetic radiation. In some embodiments, the layer of TiN is of the order of 4 nm thick. In FIG. 1A, the arrows pointing to the "top" (or exposed) surface of the bolometer are intended to denote the illumination of the exposed surface with electromagnetic radiation.

The thermal responsivity of our frequency shift IR bolometer can be analyzed as follows. If G denotes the thermal conductance through the supporting rods, C is the heat capacity of the sensitive volume, and $P_0$ is the IR radiation power impinging on the paddle that is modulated with frequency $\omega_m$, then the temperature rise of the sensitive area will be $\Delta T = (\eta P_0)/[G((1+\omega_m^2\tau^2)]^{1/2}$ where $\eta$ is the fraction of the incident IR power absorbed, and $\tau = C/G$ is the time constant characterizing the thermal response. From the definition of the temperature coefficient of frequency shift $TCF = (1/f)[(df)/(dT)]$, where f is the device resonant frequency. The responsivity R, which represents the frequency shift induced by power absorption, can be expressed as $$R = \frac{\Delta f}{P_0} = \frac{\eta(TCFf_0)}{G\sqrt{(1+\omega_m^2\tau^2)}} \quad (1)$$

The mode-dependent TCF formulas for a stressed torsional resonator, which is derived in the APPENDIX—Supporting Information, can be expressed as follows $$\text{Flexural mode } TCF = \frac{\alpha+\beta}{2} - \frac{3}{5}\left(\frac{l}{h}\right)^2\alpha \quad (2a)$$

$$\text{Torsional mode } TCF = \frac{\alpha+\beta}{2} \quad (2b)$$

Figures 10A, 10B:
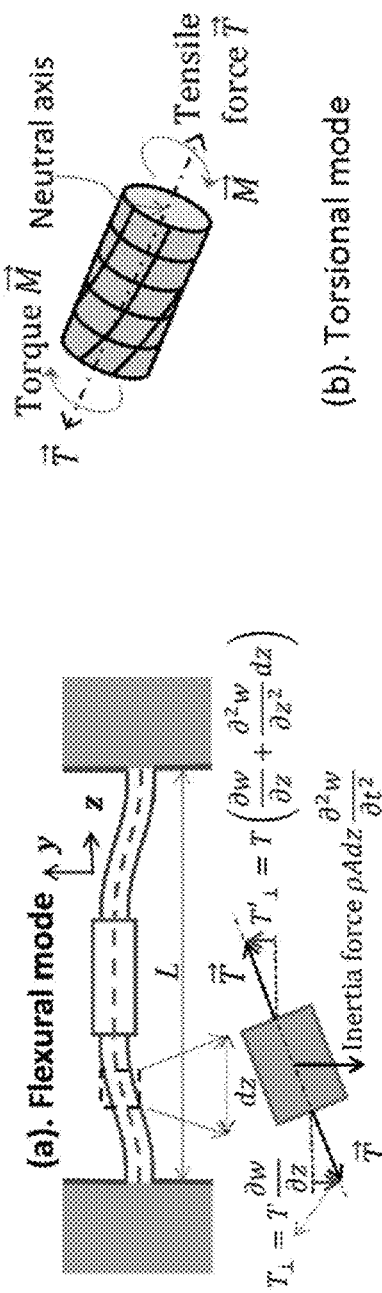
FIG. 10A is a diagram that illustrates a flexural mode. In the flexural mode, the tensile force T has a component along the direction of beam motion z, and thus contributes to its resonant frequency and temperature coefficient of frequency shift (TCF). In the equations, w is the displacement in the y direction.
FIG. 10B is a diagram that illustrates a torsional mode. For the torsional mode, the tensile force T is along the direction of torsional axis, and generates no torque. Therefore, the tensile force does not affect the torsional resonant frequency. This leads to an exceptionally linear torsional mode with a reduced TCF.
Figure 11:
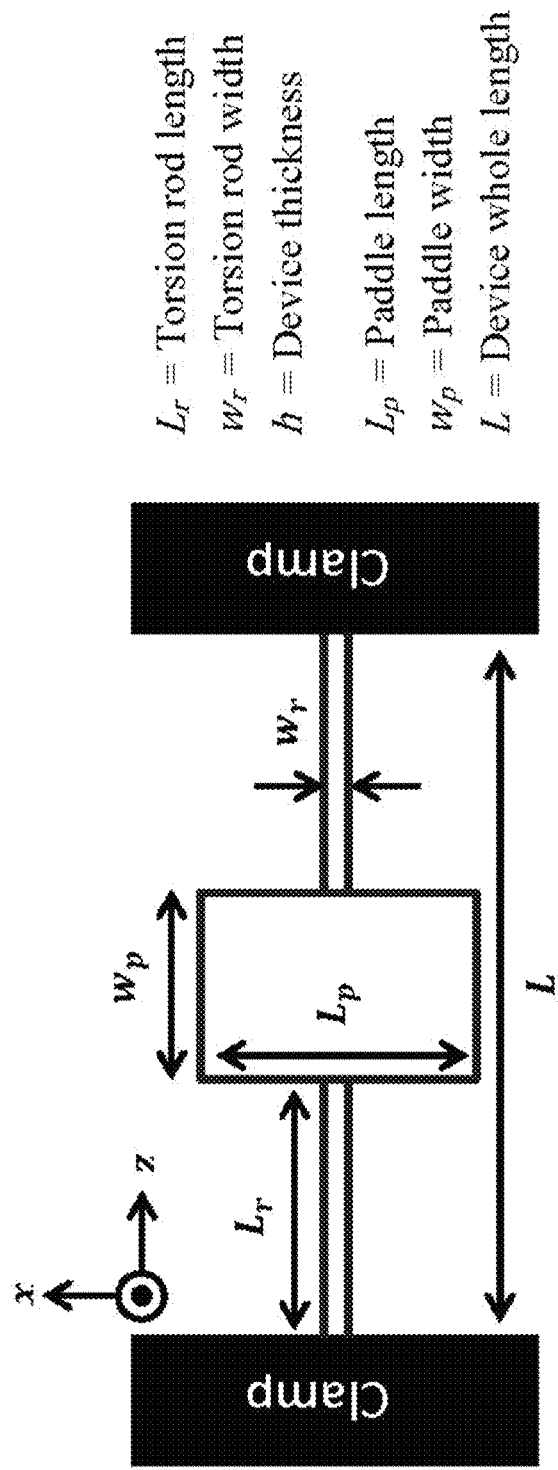
FIG. 11 is an in plane view diagram of the torsional device with the geometry labels used in the calculations. The origin of the coordinate system is at the center of the left hand clamped end.

Here $\alpha=(1/l)[(dl/dT)]$ is the linear thermal expansion coefficient, $\beta=(1/E)[(dE/dT)]$ is the temperature coefficient of Young's modulus E, and l and h are the length and thickness of the torsion rods, respectively. For a silicon nitride (SiN) film, $\alpha=3\times10^{-6}$ K$^{-1}$ and $\beta=-4.8\times10^{-5}$ K$^{-1}$. Note that the TCF of the flexural mode possesses an additional term $-(l/t)2\alpha$. This geometric factor, which is enhanced for structures with a large aspect ratio, originates from the thermally induced stress, denoted as $\sigma_{th}=-\alpha E\Delta T$. This thermal stress has a component along the direction of motion of the flexural mode and thus acts to soften its spring constant (see FIG. 10) and change its resonant frequency (see APPENDIX—Supporting Information eq S14). By contrast, the thermal stress is parallel to the torsional axis and hence generates zero torque. Accordingly, thermal stress has negligible influence on the resonant frequency of the torsional mode. Equations 2a and 2b qualitatively agree with the experimentally measured TCF values displayed in FIG. 9A.

Upon a uniform downscaling of all dimensions by a common factor, the resonant frequency $f_0$ will be increased by the same factor, as will the thermal resistance $1/G=1/\kappa A$; A is the cross sectional area of the supporting rod. Hence, according to eq (1), the frequency-shift-based thermal responsivity, R, will scale inversely with linear dimension squared. This favorable scaling gives NEMS devices their advantageous thermal responsivity compared to MEMS. The scaling law should also apply for a structures patterned from composite materials where the parameters, E, density ρ, stress σ, and α, can be replaced with effective values that represent weighted averages of the two materials.

The ultimate sensitivity of our frequency-shift-based detector is limited by various frequency noise processes, of either intrinsic or extrinsic origin. We concentrate on three fundamental limits: the radiation background fluctuations, temperature fluctuations, and thermomechanical noise.

All thermodynamic systems are subject to energy fluctuations with the environment, given their finite thermal conductance and heat capacity. These energy fluctuations are manifested as temperature fluctuations, their mean square value, integrated over all frequencies, is $\overline{\Delta T^2}=(4 k_B T^2/C)$, where $k_B$ is the Boltzmann constant. The smaller the device (hence smaller C), the more severely will frequency stability be compromised by this temperature noise.

NETD is defined as the minimum resolvable temperature difference within an imaged scene. It depends on the intrinsic properties of the detector, but also on the detector assembly's efficiency to capture the IR radiation emanating from the scene (see eq S26 in APPENDIX—Supporting Information.) The limitation to NETD imposed by temperature fluctuations is depicted by the "TF" labeled curve in FIG. 1D (see details in APPENDIX—Supporting Information). As expected, a lower G or better thermal isolation yields a lower NETD. In ambient conditions, the maximum achievable thermal isolation is limited by the air beneath the paddle. In vacuum, the ultimate lowest thermal conductance is set by the radiation law $G_{rad}=4\epsilon_{SiN}A_d\sigma_T T^3$, where $\epsilon_{SiN}=0.6$ is the emissivity of SiN, $A_d$ is the detector sensitive area, and $\sigma_T$ is the Stephan-Boltzmann constant.

Thermomechanical noise also imposes a fundamental limit to the device's frequency stability. It induces fluctuations in the resonator's position at finite temperatures, thus imposing a fundamental limit on the displacement sensitivity of the device. Thermal displacement fluctuations with a spectral density $S_x(\omega)$ generate phase fluctuations $S_\phi(\omega)=S_x^2(\omega)/\langle x \rangle^2$, and in turn frequency fluctuations $S_\omega(\omega)=[\omega_0/(2Q)]^2 S_\phi(\omega)$ with a spectral density of $S_\phi(\omega)$ and $S_\omega(\omega)$, respectively. Here $\langle x \rangle$ is the rms of the resonator amplitude and $\omega_0$ is the resonant angular frequency. The frequency fluctuations caused by thermomechanical noise are represented as $\delta\omega_0=\{[(k_BT)/(E_c)](\omega_0 BW)/Q\}^{1/2}$, where $E_c$ is the carrier energy and BW is the measurement bandwidth. For the torsional mode, we have $E_c=I\omega_0^2 \langle \theta_c^2 \rangle$, where I is the moment of inertia, and $\theta_c$ is the displacement angle of 3.6° (the maximum value observed with our device, see below). These frequency fluctuations $\delta\omega_0$ can be referred back to the input domain and represented as equivalent power fluctuations, $\delta P_{TM}=G\delta\omega_0/(\omega_0 TCF)$. The NETD limited by such thermomechanical noise processes is labeled by "TM" in FIG. 1D. We assume values of TCF=0.01% and $f_0$=10 MHz in our calculations.

The total NETD=$[(NETD_{TF})^2+(NETD_{TM})^2]^{1/2}$ is shown by the curve labeled TF+TM in FIG. 1D. The actual thermal conductance of the device is shown by the two vertical dashed lines, where we assume a thermal conductivity of 0.5 and 3.2 W/(m·K) for α-Si and SiN, respectively. It is apparent that attaining a NETD below 10 mK is feasible. It is believed that devices exhibiting an achievable temperature resolution below 100 mK (e.g., below 90 mK, below 80 mK, below 70 mK, below 60 mK, below 50 mK, below 40 mK, below 30 mK, below 20 mK, or below 10 mK) can be fabricated according to the principles of the present invention. Such devices are expected to exhibit high Qs in vacuo, in the range of 1,000 to 100,000 or more (e.g., Q greater than 1,000, Q greater than 2,000, Q greater than 5,000, Q greater than 10,000, Q greater than 20,000, Q greater than 50,000, Q greater than 100,000), as described herein.

Microscale torsional resonators have been employed in applications such as optical mirrors in digital light processing (DLP) technology, switches, intensity, and/or phase modulators. Compared with their microscale counterparts, there have been relatively few studies of nanoscale torsional resonators. Evoy et al. report micrometer-scale silicon torsional devices. The smallest torsional devices reported are those that incorporate a carbon nanotube tube (CNT) as the torsional spring for a submicrometer size metal paddle. These devices exhibit appealing properties including an unusually large deflection angle of 180° due to the extremely soft spring constant $(\kappa) \sim 3\times10^{-18}$ N·m, a torsional piezoresistive effect, and electrically detected torsional resonances. Nevertheless, their Qs are low, only in the range of 78-250 and they suffer from the fact that it is very problematic to implement large-scale integration of these devices to make pixel arrays. Their soft torsion spring also results in a high angular displacement noise floor of 3°, consequently yielding a rather limited dynamic range of only ~35 dB. We report dynamic properties of SiN-based torsional resonators with nanoscale supporting rods, with particular focus on their superior torque and angular displacement sensitivities, dynamic range, frequency stability, and thermal sensitivities for IR detection.

Figure 1C:
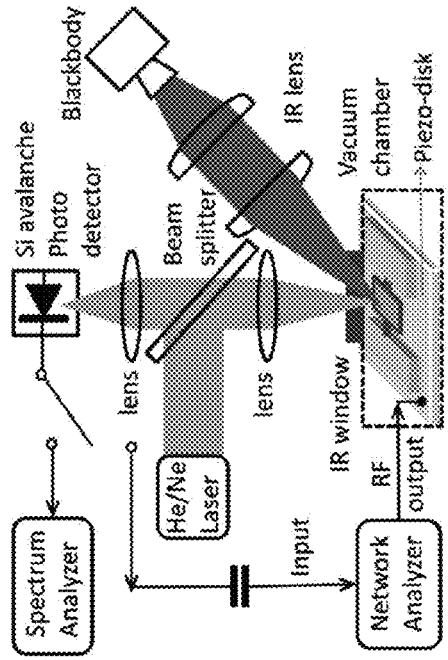
FIG. 1C is a schematic diagram of an optical interference setup used to detect the resonant frequency shift of the device upon IR radiation.

Our torsional resonators are made from 100 nm thick low stress SiN grown by low pressure chemical vapor deposition (LPCVD) onto a Si substrate (fabrication details are presented in APPENDIX—Supporting Information). Each of the supporting rods is 50-100 nm wide, 2 μm long, and its paddle is 2 μm wide and 5 μm long. The devices are mounted on piezoceramic disks for actuation and are characterized by laser interferometric displacement detection that is schematically shown in FIG. 1C. The IR radiation from the blackbody is focused by an IR lens through a ZnSe window onto the sample that is housed within a vacuum chamber. The chamber is evacuated below a 10-5 Torr pressure to exclude damping and heat conduction effects through the air.

Figure 6A:
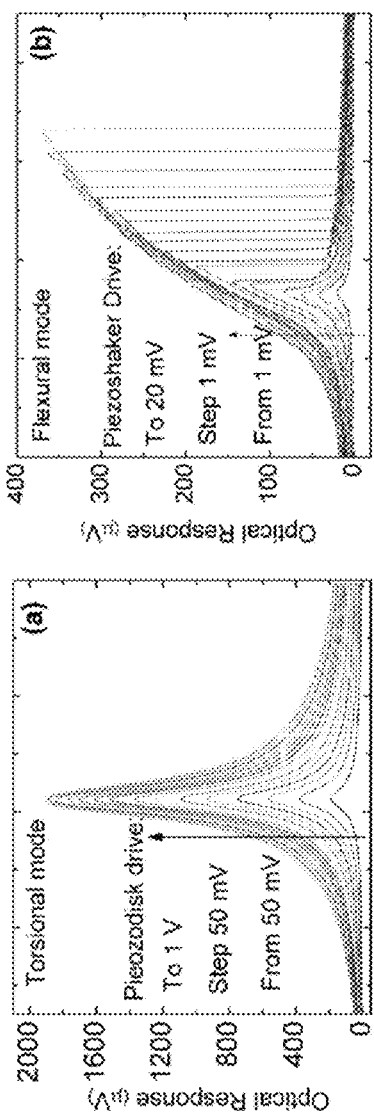
FIG. 6A is a graph showing the optically detected resonances at various actuation levels for the torsional mode.
Figure 6B:
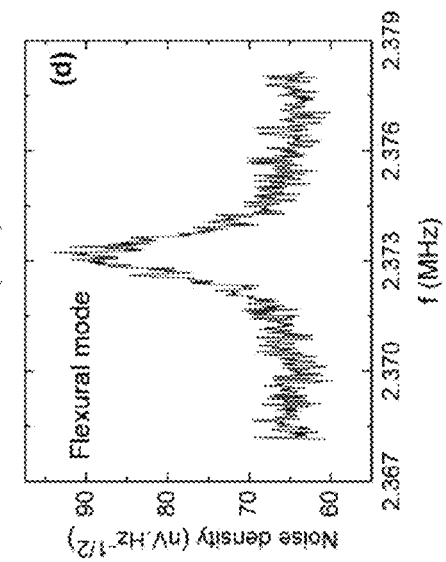
FIG. 6B is a graph showing the optically detected resonances at various actuation levels for the flexural mode.
Figure 6C:
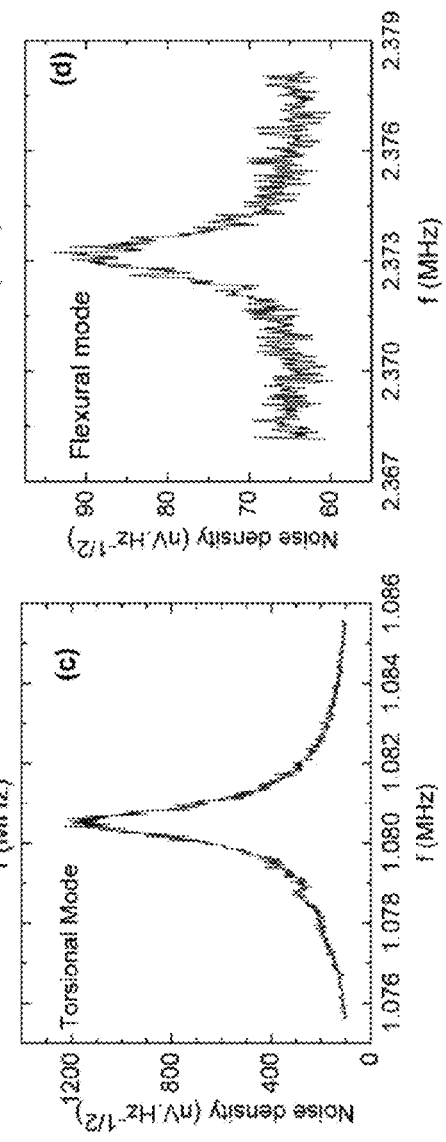
FIG. 6C is a graph of the thermomechanical noise spectrum measured for the torsional mode.
Figure 6D:
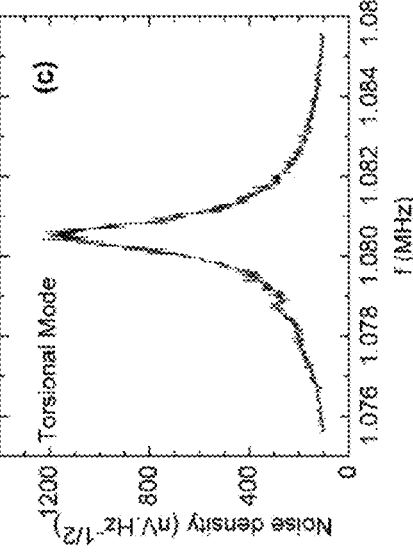
FIG. 6D is a graph of the thermomechanical noise spectrum measured for the flexural mode.

The driven torsional and flexural resonances are depicted in FIG. 6A and FIG. 6B, respectively. What is most immediately evident from the flexural mode is its mechanical nonlinearity onset occurring at a several millivolt actuation. We are able to record the thermomechanical noise spectra of both modes. The torsional mode (FIG. 6C) exhibits 1 order of magnitude higher noise spectral density than the flexural mode (FIG. 6D); this is a combined result of the soft torsional spring constant, the paddle length, and the location of the laser spot on the paddle.

The torsional angular displacement noise spectral density can be expressed as $S_\theta^{1/2}=[(4 k_B TQ)/(\omega_0 \kappa)]^{1/2}$, where $\kappa=2KG_s/L$ is the torsional spring constant, $G_s$ is the shear modulus, and K is the torsional moment of inertia expressed in APPENDIX—Supporting Information eq S21. It can be experimentally determined by $\kappa=\omega_\theta^2 I$. Using the expression of $S_\theta^{1/2}$, an angular displacement resolution of $1.18\times10^{-7}$ rad·Hz$^{-1/2}$is obtained. Details of that calculation can be found in Li, M.; Tang, H. X.; Roukes, M. L. Nat. Nanotechnol. 2007, 2, 114-120. The torque thermomechanical noise spectral density is $S_T^{1/2}=S_\theta^{1/2}(\kappa/Q)=[(4 k_B T\kappa)/(\omega_0 Q)]^{1/2}$. Following similar procedures, a torque resolution on the order of $10^{-22}$ (N·m)Hz$^{-1/2}$ is obtained. Table 1 summarizes the analyzed results for both modes.

TABLE 1

Parameters for the Torsional and Flexural Modes of a Torsional Resonator

| Quantity/Mode | Torsional | Flexural |
|---|---|---|
| Q | 1555 (92)* | (2466) (92.2)* |
| Angular displacement resolution | $1.18 \times 10^{-7}$ rad · Hz$^{-1/2}$ | $2.33 \times 10^{-12}$ m Hz$^{-1/2}$ |
| Torque (force) resolution | $1.72 \times 10^{-22}$ (N · m) Hz$^{-1/2}$ | $5.19 \times 10^{-16}$ N Hz$^{-1/2}$ |
| Maximum angular displacement achieved | >3.6 degrees | N/A |
| Dynamic range (dB) | ≥100 | 58 |

Asterisk (*) denotes value of Q in measured in air

The dynamic range (DR) of NEMS is the ratio of its largest linear amplitude and the rms of the amplitude noise floor $S_x$. Typically expressed in decibels (dB), it specifies the linear operating range of the device. For a flexural mechanical resonator, it is formulated as DR(dB)=20 log$[0.745 x_{nc}/(2 S_x BW)^{1/2}]$, where $0.745 x_{nc}$ is the 1 dB compression point of the onset of the nonlinear resonance. On the basis of the data presented in FIG. 6, the flexural dynamic range is determined to be 58 dB.

Torsional vibration studies of dynamic range are hampered by the inherent nonlinearity of the optical transduction technique, which has many experimental manifestations. FIG. 7A shows the center resonance amplitude versus the actuation power in the logarithmic scale for another device. A linear response below 20 dBm actuation evolves into a down turning behavior at higher powers. The same data linearly plotted in the top left inset can be precisely fitted by a sinusoidal function. All these findings are indications of the linearity of the torsional motion, elaborated by the simple model presented below. The conclusion of this analysis is that the devices in FIG. 7A-FIG. 7C are actually in their linear operation region over the whole power range explored. The dynamic range of the device in FIG. 7A can thus be estimated to be 100 dB, based on the thermomechanical noise spectrum in the lower right inset.

FIG. 7B shows the torsional amplitude initially linearly increasing with the actuation. At a critical drive, the resonance amplitude saturates and starts to split into doublet peaks. The splitting gradually grows with the actuation but with the peak height staying constant. This is more evident in the scale plot in the inset of FIG. 7C.

We find that the optical nonlinear effect in our experiment can be accounted for by a simple interference model (see APPENDIX— Supporting Information). When the device vibrates at an amplitude x, the laser interference intensity, I(r), becomes modulated. The modulation depth in I(r), $\Delta I$ recorded by the photodetector provides measure of the device resonant amplitude, that is, the optical displacement signal $$\Delta I = 4A_0 \sin(2kd)\sin(2kx) = A_1 \sin(2kx) \quad (3)$$

Here d is the interference cavity separation, k is the wave vector of the laser light, and $A_0$ and $A_1$ are constants. Equation 3 justifies the sinusoidal dependence in the top inset of FIG. 7A. It also suggests that the displacement signal will reach a maximum when $2kx=\pi/2$, that is, $x=\lambda/8$. Thus, the split, constant-height peaks in FIG. 7B are positions where the resonator's amplitude reaches $\lambda/8$ on both sides of its center resonance. We further quantify the splitting versus the actuation level based on a driven damped harmonic resonator model (see APPENDIX—Supporting Information)

$$\Delta\omega = \frac{\omega_0}{Q}\sqrt{\left(\frac{x}{x_c}\right)^2 - 1} = \frac{\omega_0}{Q}\sqrt{\left(\frac{V}{V_c}\right)^2 - 1} \quad (4)$$

V is the RF voltage applied on the piezodisk, which acts as a linear actuator in the power range described herein. $V_c$ is the RF voltage when $x_c=\lambda/8$. Plotted in FIG. 7C, the splittings versus actuation voltages show an almost perfect square-root law, as described by equation (4). The maximum attained amplitude is approximately $a_{max}=2x_c=\lambda/4$. If one assumes that the laser spot shines in the proximity of the paddle edge, which is 2.5 µm away from the torsional axis, the maximum torsional angle is 3.62°. The thermomechanical noise spectrum yields an angular noise floor about $1.55\times10^{-5}$ degree. Thus, the dynamic range of this second device is 107.4 dB, which is comparable with the device in FIG. 7A.

These results unambiguously demonstrate the linear nature of the torsional mode despite the artifacts caused by the optical nonlinearity. While nonlinear Duffing behavior of the torsional mode has been reported in previous studies, these nonlinearities appear to originate either from the electrostatic driving and detection method, or by the increase of the intershell coupling in the multiwalled CNT torsional rod. As such, they are not applicable to our devices.

In our torsional devices with ~100×100 nm$^2$ cross sectional supporting rods, the torsional dynamic range is 40-50 dB higher than that of the flexural mode. Theory predicts a dependence of the dynamic range on $D[(D/L)^5]^{1/2}$ and $(D^7L)^{1/4}$ for the flexural and torsional mode, respectively, where D is the diameter and L is the length of the supporting rods. (See APPENDIX— Supporting Information) The torsional dynamic range degrades much more slowly as the rod diameter is reduced. Increasing the rod length L, which is favorable for enhancing thermal isolation, will give an advantageous torsional dynamic range but will adversely affect the flexural DR.

Figures 8A, 8B:
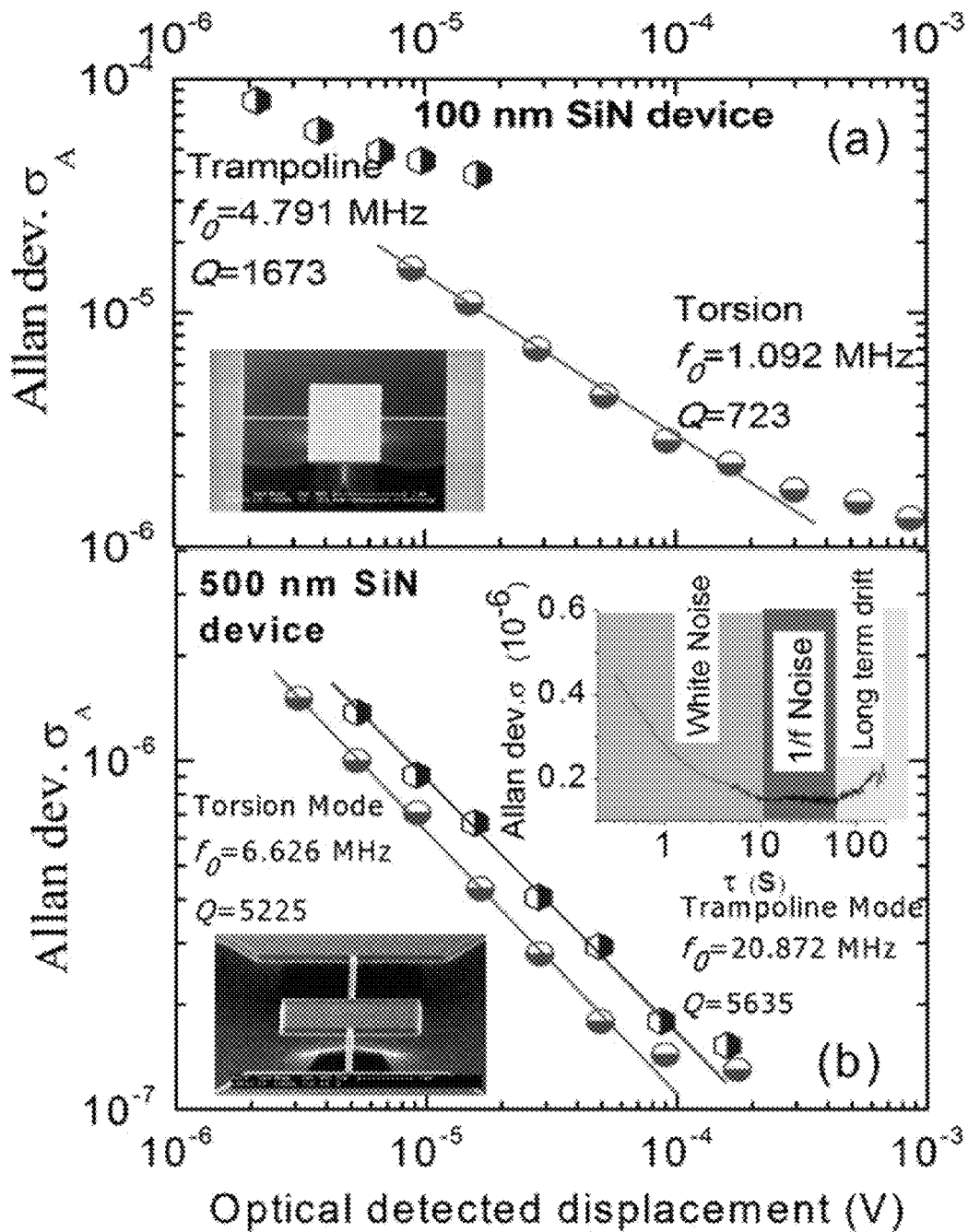
FIG. 8A is a graph of the Allan deviations (at an interval time τs=1 s) versus the optically detected resonance amplitude (in volts) for the torsional and flexural mode for a 100 nm thick, 80 nm wide rod SiN device. The paddles have an area of 10 µm$^2$ (e.g., dimensions of 2 µm×5 µm).
FIG. 8B is a graph of the Allan deviations (at an interval time τs=1 s) versus the optically detected resonance amplitude (in volts) for the torsional and flexural mode for a 500 nm thick, 200 nm wide rod SiN device. The paddles have dimensions of 2×5 µm. The inset of FIG. 8B shows an exemplary curve of Allan deviation as a function of interval time.

We compare the frequency stability of both modes in the time domain, as characterized by their Allan deviation (AD). The device in FIG. 8A has 100 nm thick and 80 nm wide supporting rods, while a more "bulky" device with 500 nm thick and 200 nm wide rods is shown in FIG. 8B. Their paddles are the same area (2×5 µm$^2$) except they have different thicknesses. The AD is the root of the time variance of the measured frequency of a source, each measurement averaged over a time interval $\tau_A$. Its definition and the measurement method are described in APPENDIX—Supporting Information.

The measured ADs at $\tau_A=1$ s are plotted in FIG. 8A and FIG. 8B as a function of device amplitude (characterized by the optical displacement signal in volts). The thicker device possesses an Allan deviation that is over 1 order of magnitude better. At $\tau_A=1$ s, the frequency fluctuations are dominated by white noise processes originating from either thermomechanical or photodetector shot noise, as the inset of FIG. 8B indicates. By shrinking the device size from FIG. 8B to FIG. 8A, the torsional and flexural AD suffers from 1 and 2 orders of magnitude degradation, respectively. The less severe reduction of the torsional AD is correlated with its wider DR, evidenced by a wider data range on the x-axis of FIG. 8A. The x-data range represents the device's practical working zone. Further actuating the device above this range is hampered by the mechanical or the optical transduction nonlinearity for the flexural and torsional mode, respectively.

We have also studied the TCFs of both modes. There are two types of devices investigated in this study: one has 10 nm thick gold film only on the paddle while the rod is pristine SiN; and the other has 12 nm thick gold film covering the whole surface. The focused laser can generate local heating to induce a frequency shift of the device. The laser power is varied between 0.125 and 1.25 mW with the resulting mode-dependent relative frequency shifts listed in Table 2. Since the temperature distribution profile remains identical during the measurement, we can infer that the flexural mode possesses a 6-8 fold larger TCF than the torsional mode.

TABLE 2

Relative Frequency Shift ($\Delta f$)/f When Incident Laser Power Increases from 0.125 to 1.25 mW

| Sample | Torsional (%) | Flexural (%) | TCF$_{Flex}$/TCF$_{Torsion}$ |
|---|---|---|---|
| Gold only on paddle | −0.38 | −3.1 | 8.16 |
| Gold all over | −0.039 | −0.26 | 6.67 |

We have also quantitatively measured the TCF by applying Joule heating to the device through the thin gold film overlayer. The applied voltages are converted into temperatures by finite element method (FEM) simulations. The obtained TCFs as shown in FIG. 9A are 92 and 548 ppm·K$^{-1}$ for the torsional and flexural mode, respectively. FIG. 9B is a plot of the temperature profile at a bias of 0.056 V. As expected, the paddle is at a uniform temperature of 329.6 K due to its gold coating. Most of the temperature gradient occurs along the thin rods. The total temperature rise is 36.4 K, as plotted in FIG. 9C.

The noticeable resonance frequency shift with the temperature indicates that the torsional devices can be used as sensitive thermal detectors. We deposit a TiN film as an IR absorber by the magnetron sputtering method. Its IR reflection and transmission shows a strong function of the film thickness in the several-tens-of-nanometer range. The near-infrared absorption reaches a maximum 30% when the film thickness is about 15 nm.

We use an all-optical system shown in FIG. 1C to directly measure the NETD. To ensure that the heating arises predominantly from the infrared radiation, the intensity of the probing laser is kept at a minimal level as low as 33 nW. We characterized the IR response of a SiN torsional device covered by 20 nm sputtered TiN. The resonances in FIG. 9D show a systematic redshift with the blackbody temperature. The fractional frequency shift is approximately 0.1% when the blackbody temperature rises from room temperature to 375° C. The quality factor Q is about 913, remaining roughly constant over the temperature range. The resonant frequency reveals a quadratic relationship with the blackbody temperature as shown in FIG. 9E. The nonlinear response of the device could be caused by the absorber which is wavelength selective for the incident infrared radiation. Using the Allan deviation $\sigma_A=10^{-6}$ and the total frequency shift $\Delta f=750$ Hz, a NETD=$(\Delta T_{bb} f_0 \sigma_A)/(\Delta n=390$ mK is calculated, where $\Delta T_{bb}=350$ K is the total blackbody temperature variation. This temperature resolution is comparable with the reported NETD's of MEMS cantilever based IR detectors.

It is believed that one can improve the NETD of these NEMS-based devices. The device thermal conductance can be lowered by 1 order of magnitude if α-Si is employed as the structural material. Another technical path is to improve the collection efficiency of the infrared optics by employing a low f-number IR lens. By adopting such technical innovations, we believe that a NEMS-based frequency shift infrared bolometer should be able to reach a NETD<10 mK.

We have demonstrated ultrahigh angular displacement, torque sensitivities, wide dynamic range (>100 dB), and superior frequency stability of nanoscale torsional resonators. We predict that the torsional resonator could be used as an ultrasensitive IR detector with achievable temperature resolution in the range below 10 mK. We have demonstrated the first prototype devices based on very small paddle structures supported by thin nanorods, with significant promise for further scaling and optimization.

Resonant RF NEMS Bolometer Comprising Pixels

In one embodiment, the resonator is a high-Q torsional resonator operating in the vicinity of 10 MHz, and having a Q>100,000 in vacuo, and an Allan Deviation, $\sigma_A$, of the order of $10^{-7}$. The Allan Deviation is a non-classical statistic used to estimate stability.

The bolometer operates using the temperature dependence of its resonance in order to detect absorbed radiation. The temperature coefficient, TC, of the resonant frequency is given by $$TC = [1/f_0][\partial f_0/\partial T]$$

and is expected to have as a value TC~10,000 ppm/K (or 10,000 parts per million per Kelvin).

The responsivity, $\Re f$, is given by $$\Re f = \frac{\delta f_0}{\delta P} = \frac{\left(\frac{\partial F_o}{\partial T}\right)\delta T}{G \delta T} = \frac{1}{G}\frac{\partial f_0}{\partial T} = \frac{f_0 TC}{G}.$$

We will use the values $f_0$~10 MHz and TC~10,000 ppm/K in the following derivations.

We will estimate G under the assumption that the torsional rod support is made from pure a-silicon. We have $$\kappa(T=300K)_{a-Si} \sim 0.25 \text{ W}/(K \cdot m)$$

The torsion rod cross section is given by $$A = (5 \times 10^{-8} \text{ m})^2 = 2.5 \times 10^{-15} \text{ m}^2$$

The torsion rod length $l = 1$ μm $= 1 \times 10^{-6}$ m. Thus an estimate for G is $$G = \kappa A / l \sim (0.5 \text{ W}/(K \cdot m)) \cdot (2.5 \times 10^{-15} \text{ m}^2)/(1 \times 10^{-6} \text{ m}) \sim 1.25 \times 10^{-9} \text{ W/K}$$

An estimate for $\Re f$ is $$\Re f = \frac{f_0 TC}{G} = $$
$$(10 \text{ MHz}) \cdot (10,000 \text{ ppm/K})/(1.25 \times 10^{-9} \text{ W/K}) \sim 8 \times 10^{13} \text{ Hz/W}$$

Noise equivalent power (NEP) for frequency shift detection is defined as $$NEP|_{f_0} = \langle \delta f^2 \rangle^{1/2}/\Re f \sim 2\sqrt{2}\sigma_A f_0 / \Re f$$

The noise equivalent power (NEP) is a measure of the minimum thermal power detectable by the IR bolometer, and is set by the noise processes of the detector (both intrinsic and extrinsic). In order to project the ultimate performance of our IR bolometers, it proves illuminating to classify the noise contributions into two terms—one term that broadly reflects the noise sources typically found in NEMS operated for frequency-shift detection, and a term that, while typically ignored in our previous NEMS application efforts, becomes significant for these unique structures. The first of these terms, which we will call $NEP|_{f_0}$, can be parametrized in terms of the typical fractional frequency fluctuations, or Allan deviation $\sigma_A$, during a frequency-shift measurement of a NEMS device. The origins of these fluctuations are manifold, from thermomechanical noise to transduction and amplifier contributions. For NEMS resonators operating at room temperature in atmospheric pressure, we have achieved $\sigma_A < 10^{-6}$, while for cryogenically-cooled NEMS in UHV conditions, we have realized Allan deviations approaching $\sigma_A \sim 10^{-8}$. Assuming a median Allan deviation of $\sigma_A < 10^{-7}$, we derive $NEP|_{f_0}$ from $$NEP|_{f_0} = \frac{2\sqrt{2}\sigma_A f_0}{\Re} = \frac{2\sqrt{2} \times (10^{-7}) \times 10 \text{ MHz}}{8 \times 10^{13} \text{ Hz/W}} = 35.4 \text{ fW}.$$

The second noise term comes from the extreme thermal isolation of the paddle from its environment, which results in thermodynamic fluctuations of the resonator's temperature. For a small body thermally isolated from its environment, the temperature noise power due to thermal fluctuations is $$S_{\delta t}(\omega) = \frac{4k_B T^2}{G} \frac{1}{1+(\omega \tau_{th})^2}.$$

We assume that our noise integration bandwidth $\Delta\omega$ is maximal, meaning we integrate up to the thermal time constant roll-off. Thus the total thermal noise power in our measurement bandwidth can be estimated, and then converted into the noise equivalent power $NEP|_{TF}$ using the thermal conductance, like so:

$$NEP|_{TF} \sim G \times \sqrt{S_{\delta T}(\omega=0) \times \Delta\omega} = \sqrt{\frac{4Gk_B T^2}{\tau_{th}}} = 660 \text{ fW}.$$

The total noise equivalent power is thus determined by adding the two noise terms in quadrature:

$$NEP|_{tot} = \sqrt{(NEP|_{f0})^2 + (NEP|_{TF})^2} = 661 \text{ fW}.$$

As can be seen, thermal fluctuation is expected to be the dominant noise source for our IR bolometers.

Finally, the noise equivalent temperature difference (NETD) can be determined. The NETD is defined as the minimum detectable temperature difference of a target relative to its environment; thus it not only depends on intrinsic properties of the detector, but also how the target radiation is delivered to the detector. The amount of power received by an IR detector $\delta P_t$ can be related to the temperature difference $\delta T_t$ of a target relative to its surroundings (assuming classic blackbody radiation) in the following formula:

$$\delta P_t = \frac{\alpha_0 A_d}{4F^2} \left(\frac{dP}{dT}\right)_{\lambda_1, \lambda_2} \delta T_t$$

Here $\alpha_o$ is the absorption efficiency of the detector, $A_d$ the detector capture area, F the f-number of the supporting optics of the detector system, and $dP/dT$ is the variation of blackbody power with temperature at the background temperature, within the IR wavelength band set by $\lambda_1$ and $\lambda_2$. We will assume typically-realizable numbers for these parameters: $\alpha_o=0.9$, $F=1.0$, and, for a medium IR band of 8-14 µm, $dP/dT=2.62$ W/m$^2$·K. Inserting these numbers, we have $$\delta P_t = \frac{0.9 \times 200 \text{ }\mu m^2}{4}(2.62 \text{ W/m}^2 \cdot K)\delta T_t = (118 \text{ pW/K}) \times \delta T_t$$

We can then directly determine the NETD by combining this with the previously-derived NEP:

$$NETD = \frac{NEP|_{tot}}{\frac{\delta P_t}{\delta T_t}} = \frac{661 \text{ fW}}{118 \text{ pW}} \cdot K = 5.6 \text{ mK}.$$

We can estimate a thermal time constant, $\tau_{th}$, as $$\tau_{th} = C_{tot}(T)/G$$

The components of $C_{tot}$ include, for 50 nm thick a-silicon having an area of 10 µm×20 µm, $C_{a-Si}(T=300K) = (1.6\times10^6 \text{ J/K·m}^3) \cdot (2.5\times10^{-18} \text{ m}^3) = 4.0\times10^{-12} \text{ (J/K)}$ For 4 nm thick TiN (also with an area of 10 µm×20 µm)

$C_{TiN}(T=300K) = (2.3\times10^6 \text{ J/K·m}^3) \cdot (2.5\times10^{-18} \text{ m}^3) = 5.8\times10^{-12} \text{ (J/K)}$ We then estimate $\tau_{th}$ as $$\tau_{th} = (C_{a-Si} + C_{TiN})/G$$
$$= [4.0\times10^{-12}(J/K) + 5.8\times10^{-12}(J/K)]/(1.25\times10^{-9}) \sim 14.3 \text{ ms}$$

The Figure of Merit (FOM) typically quoted is

FOM = NETD×$\tau_{th}$ = (5.6 mk)(14.3 ms) = 80 mK·msec

This FOM is about 3 to 5 times better than that for current state of the art uncooled detectors.

Figure 2:
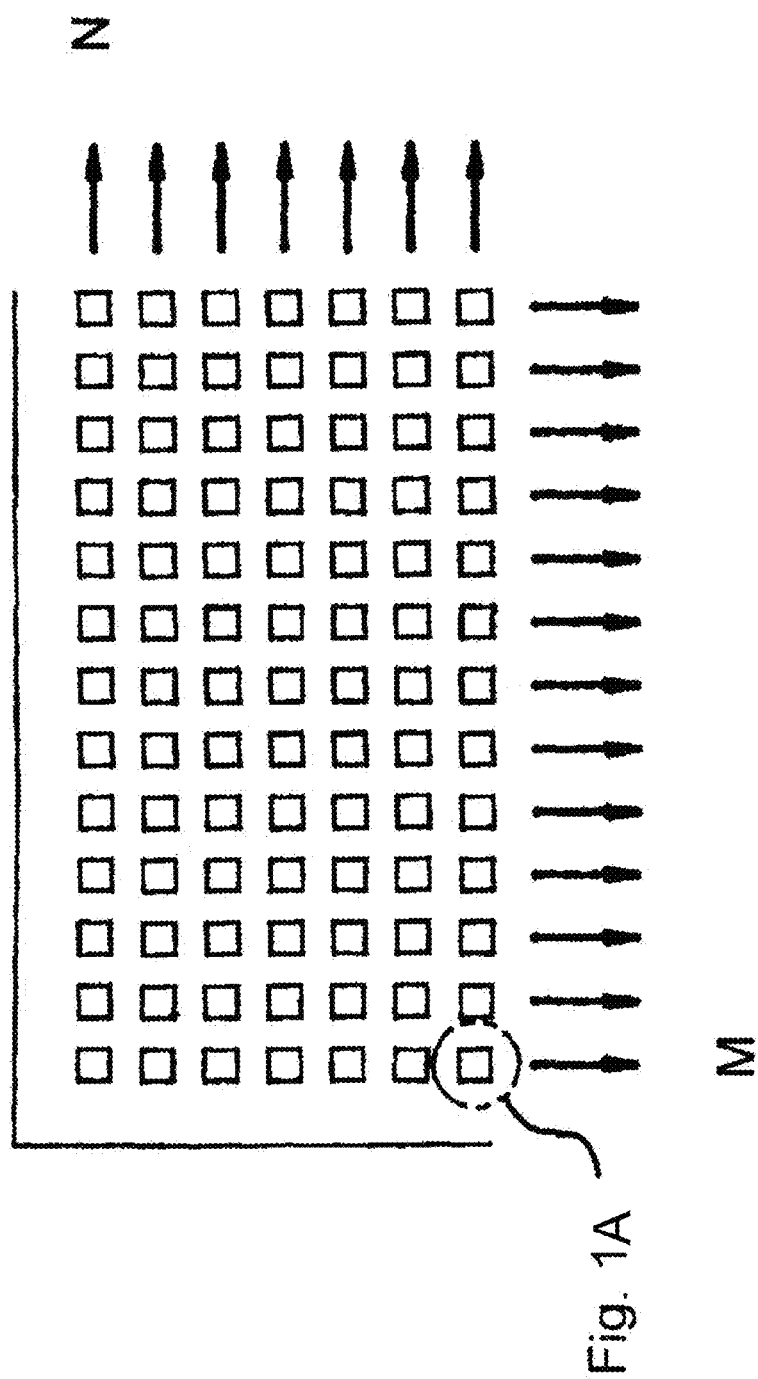
FIG. 2 is a schematic diagram illustrating an N by M array of torsional bolometer units of FIG. 1.

It is expected that one can attain high areal packing densities using NEMS processing technology. For example, all the pixels of a detector sufficient to provide an image for HDTV are expected to be fabricated on a single chip. FIG. 2 is a schematic diagram illustrating an N by M array of torsional bolometer units of FIG. 1A, where N and M are integers.

It is expected that one will be able to read out data from such a HDTV-capable chip using a phase-locked loop and taking the signal as the deviation or "error" in the loop voltage signal. Alternatively, one could use the NEMS device as the frequency-determining element in an electronic oscillator circuit. It is expected that one can multiplex the output signals to be observed using a single transmission line for a plurality of signals of interest.

Sensing Methods
Nanomagnets

The fringe field of a nanomagnet falls off on a very short distance scale. Coupling this to a NEMS resonator enables a new displacement sensing method.

Hall Displacement Sensing

Many routes to vibrational actuation and subsequent displacement sensing can be employed. Best will be those that do not involve any use of the torsion rod so that its thermal conductance can be minimized. Electrostatic actuation is probably the most straightforward. One possible technique for transduction that scales well to nanometer dimensions is local Hall displacement sensing, for example as described in U.S. Pat. No. 6,593,731.

Figure 3:
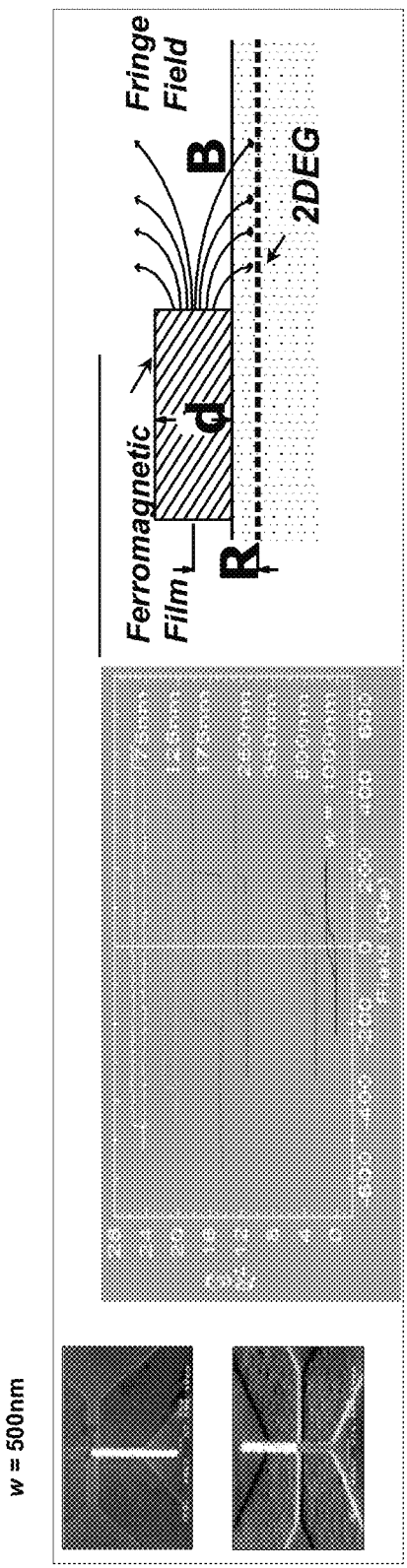
FIG. 3 is a diagram illustrating how one can sense single domain nanomagnets using Hall methods.

FIG. 3 is a diagram illustrating how one can sense single domain nanomagnets using Hall methods. The methods are explained in greater detail in F. G. Monzon, M. Johnson, and M. L. Roukes, Appl. Phys. Lett. 71, 3078 (1997), and F. G. Monzon, D. S. Patterson and M. L. Roukes, J. Mag. And Mag. Mat., 195, 19 (1999). In the left panel of FIG. 3 is shown a panel in which the configuration of the Hall detector is shown. In the center panel of FIG. 3 there is presented some graphical data of hysteresis curves for various configurations. In the right panel of FIG. 3 there is shown an illustrative diagram depicting the fringe fields from a thin ferromagnetic film.

FIG. 4A is a diagram showing the Hall sensing geometry in plan view. FIG. 4B is a diagram showing the Hall sensing geometry in perspective view. FIG. 4C and FIG. 4D are images showing the Hall sensing geometry in a fabricated device in two views at different magnifications.

Figure 5A:
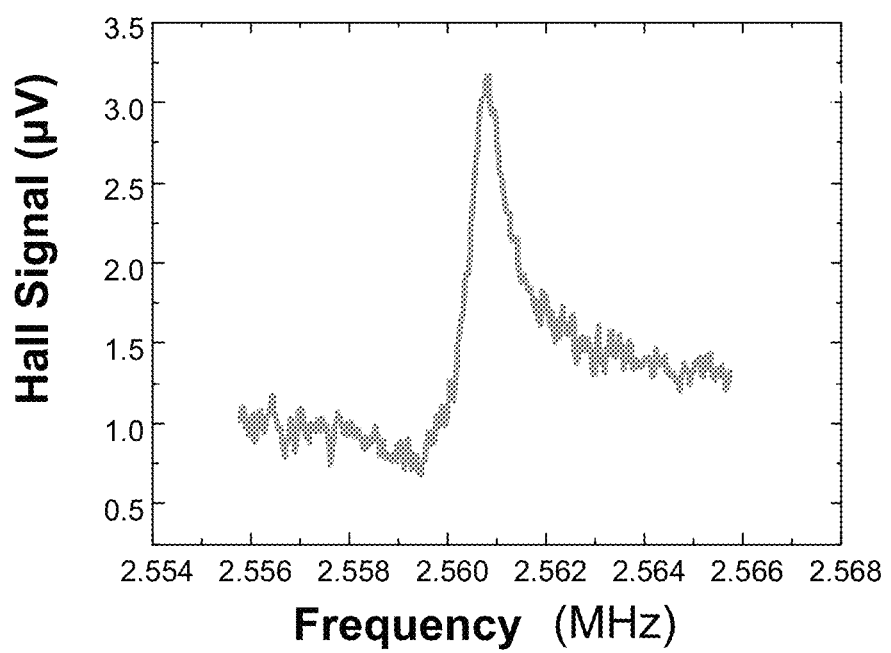
FIG. 5A is a diagram illustrating the response signal as a function of frequency for local Hall transduction.

FIG. 5A is a diagram illustrating the response signal as a function of frequency for local Hall transduction. In the observation recorded in FIG. 5A, there was used a 1 mV drive amplitude, a Hall current of 1 mA, and a preamp amplification of about 70× with a 6.8 nF capacitor.

Figure 5B:
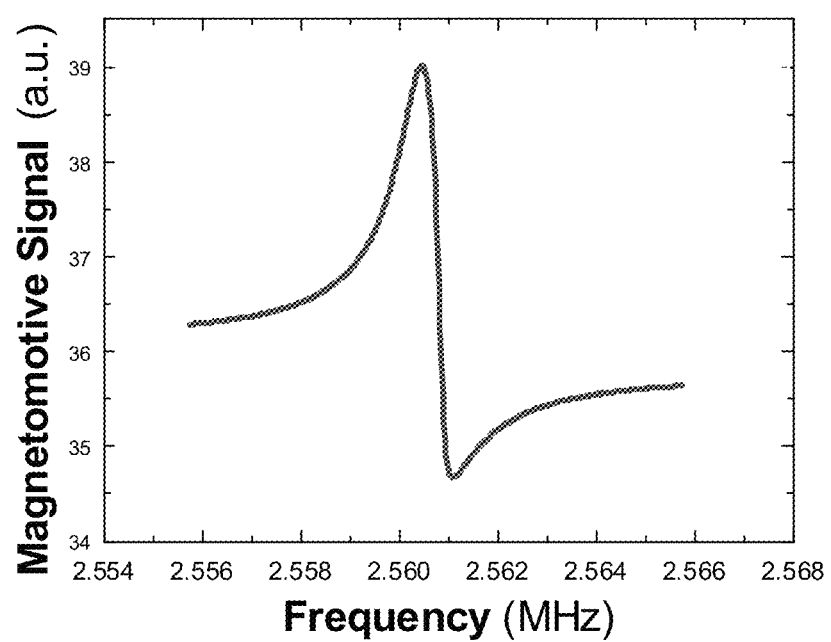
FIG. 5B is a diagram illustrating the response signal as a function of frequency for magetomotive transduction.

FIG. 5B is a diagram illustrating the response signal as a function of frequency for magetomotive transduction. In the observation recorded in FIG. 5B, there was used a 1 mV drive amplitude, a Hall current of 1 mA (DC).

In operation, a bolometer pixel according to the invention will receive incoming electromagnetic radiation, and will be heated. The change in temperature will be observable as a change in the operational characteristics of the pixel. Using a device comprising a plurality of pixels, as shown in FIG. 2 with appropriate optics, and control circuitry as may be appropriate, it should be possible in principle to obtain a thermal, or IR, image of a scene. Such a device is expected to have utility in applications such as thermal imaging, night vision, and other sensing systems that are used to detect thermal excursions, for example in maintaining operating equipment in proper thermal condition, or to detect the onset of thermal excursions such as may be caused by fire. The output from the single or plural number of sensors can be processed by any convenient computer- or microcomputer-based data processing system, and can be displayed, stored or transmitted to a remote location as may be needed. The sensor can be controlled under computer control or under the control of a user.

Another sensing approach that is expected to provide signals of interest is to bias the device pixels to a temperature above ambient using a heater and a thermal control loop. One would then read out the error signal (e.g., the signal needed to maintain constant temperature of a pixel) as data. This approach is expected to increase the dynamic range of the sensors of the invention.

It is expected that thermal excursions to lower temperatures can also be sensed, for example by observing a deviation caused by a reduction of the temperature of a pixel. Because optical losses in the vicinity of ambient temperature are small, such detection of thermal excursion may occur on a longer time scale than observations of excursions to higher temperature in response to the application of an active signal (or "forcing function").

Applications

Molecular Sensing

Nanoresonators are expected to be useful to measure changes in frequency based on changes in mass. In one embodiment, the nanoresonators are expected to be used by attaching a specific different binding material to each of N resonators, and observing which resonators change mass in the presence of a test fluid or gas so as to identify what substance might be present. As an example, an array of N resonators could each be provided with a different DNA and/or RNA moiety, and the array could be used to test for the presence of specific molecules that bind to one or ore of the DNA and/or RNA moieties. The resonators that indicate a change in frequency, indicative of binding, would provide a data set to permit determination of what molecules are present in a sample that is brought in contact with the N resonator array.

It is expected that an array having a plurality of pixel can be used to detect an optical or IR signature. In this application, one binds some material to N resonators and probes each resonator with a different wavelength, e.g., a frequency comb, to see the spectral response, for example, absorption causing a change in resonance by heating, and failure to absorb resulting in no frequency change. By analyzing the N frequencies of interest, one would expect to obtain a spectral analysis in digital form.

Operation Near Thermoelastic Resonance

In one embodiment, it is contemplated to tune IR probes according to the invention to be at or near the thermoelastic resonance frequency of the devices, so as to maximize detection. This mode of operation is the antithesis of the operation of MEMS gyros that are tuned to operate at frequencies far from the thermoelastic resonance frequency, so as to avoid losses in the gyros related to thermoelastic resonance.

In the present example, expected performance has been calculated for a specific embodiment. However, using the principles of the invention, one can generalize the results of the calculation to other absorbing configurations and types of mechanical resonators (which themselves may employ a whole range of different transducers and actuators). In some embodiments, the types of electromagnetic radiation that may be detected by the present invention include gamma rays, x-rays, ultraviolet light, visible light, infrared radiation, and microwave or millimeter wave energy.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A nanoelectromechanical sensing element, comprising:
a substrate having a surface, said substrate comprising an isotropic material, said surface having defined therein a cavity for accommodating a nanoelectromechanical structure;
a nanoelectromechanical torsional resonator having a width w and a length l, and having a torsional support connecting a first side and a second side of said nanoelectromechanical torsional resonator to said substrate, said nanoelectromechanical torsional resonator configured to receive electromagnetic radiation as a stimulus, said nanoelectromechanical torsional resonator and said torsional support configured to provide an oscillation of said nanoelectromechanical torsional resonator at a predetermined frequency; said torsional resonator having a Q greater than 1000 in vacuo; and
a displacement sensor configured to sense a displacement of said nanoelectromechanical torsional resonator relative to said substrate and configured to provide an output signal;
whereby, when the stimulus is received by said nanoelectromechanical torsional resonator, said displacement sensor provides an output signal indicative of a thermal parameter of said stimulus, wherein said stimulus is a thermal signal, wherein the nanoelectromechanical torsional resonator further comprises a material configured to absorb thermal radiation disposed on the nanoelectromechanical torsional resonator.

2. The nanoelectromechanical sensing element of claim 1, wherein said nanoelectromechanical sensing element has a temperature resolution below 100 mK.

3. The nanoelectromechanical sensing element of claim 1, wherein said nanoelectromechanical sensing element has a temperature resolution below 50 mK.

4. The nanoelectromechanical sensing element of claim 1, wherein said nanoelectromechanical sensing element has a temperature resolution below 10 mK.

5. The nanoelectromechanical sensing element of claim 1, wherein said isotropic material is amorphous silicon.

6. The nanoelectromechanical sensing element of claim 1, wherein said width w is 10 microns and said length l is 20 microns.

7. The nanoelectromechanical sensing element of claim 1, wherein said width w is 2 microns and said length l is 5 microns.

8. The nanoelectromechanical sensing element of claim 1, wherein said thermal signal is an infrared signal.

9. The nanoelectromechanical sensing element of claim 1, wherein said material configured to absorb thermal radiation is TiN.

10. The nanoelectromechanical sensing element of claim 1, wherein said cavity defined in said surface of said substrate is configured to provide a quarter wave cavity.

11. The nanoelectromechanical sensing element of claim 1, wherein said cavity comprises a reflector.

12. The nanoelectromechanical sensing element of claim 1, wherein said thermal signal is a signal selected from the group consisting of gamma rays, x-rays, ultraviolet light, visible light, microwave energy and millimeter wave energy.

13. The nanoelectromechanical sensing element of claim 1, wherein said displacement sensor is a laser interferometric displacement detector.

14. The nanoelectromechanical sensing element of claim 1, wherein said displacement sensor is a Hall displacement sensor.

15. The nanoelectromechanical sensing element of claim 1, wherein said substrate has defined therein a plurality of cavities for accommodating a nanoelectromechanical structure.

16. The nanoelectromechanical sensing element of claim 15, further comprising a first plurality of nanoelectromechanical torsional resonators, each nanoelectromechanical torsional resonator having a width w and a length l, and each having a torsional support connecting a first side and a second side of said nanoelectromechanical torsional resonator to said substrate, each of said nanoelectromechanical torsional resonators having a Q greater than 1000 in vacuo, and a second plurality of displacement sensors, at least one of said plurality of displacement sensors configured to sense a displacement of a respective one of said plurality of nanoelectromechanical torsional resonators relative to said substrate and configured to provide an output signal indicative of a stimulus applied to said nanoelectromechanical torsional resonator.

17. The nanoelectromechanical sensing element of claim 16, wherein said first plurality is equal to the product NxM, where N and M are integers.

18. The nanoelectromechanical sensing element of claim 17, wherein said NxM nanoelectromechanical torsional resonators are configured each to receive an infrared stimulus.

19. The nanoelectromechanical sensing element of claim 17, wherein said sensing element is configured to provide as output an image.

20. The nanoelectromechanical sensing element of claim 19, wherein said image is configured in an HDTV format.

* * * * *